United States Patent

Tanaka et al.

[11] Patent Number: 6,094,670
[45] Date of Patent: Jul. 25, 2000

[54] METHOD OF EXTRACTING AND EDITING MESSAGE BLOCKS IN TELECOMMUNICATIONS MANAGEMENT NETWORK AND ARRANGEMENT THEREOF

[75] Inventors: Mayumi Tanaka; Naozoh Kadoyashiki, both of Tokyo, Japan

[73] Assignee: NEC Corporation, Tokyo, Japan

[21] Appl. No.: 08/367,930

[22] Filed: Jan. 3, 1995

Related U.S. Application Data

[63] Continuation of application No. 07/774,972, Oct. 15, 1991, abandoned.

[30] Foreign Application Priority Data

Oct. 15, 1990 [JP] Japan .................................... 2-273316

[51] Int. Cl.[7] ................................................ G06F 15/16
[52] U.S. Cl. .......................................... 709/201; 709/217
[58] Field of Search .................................. 395/200, 800; 370/56, 58.1, 13; 709/201, 217, 227

[56] References Cited

U.S. PATENT DOCUMENTS

| | | | |
|---|---|---|---|
| 4,219,874 | 8/1980 | Gusev et al. ................................ 395/775 |
| 4,257,110 | 3/1981 | Lamb et al. ................................. 365/49 |
| 4,284,849 | 8/1981 | Anderson et al. .......................... 379/38 |
| 4,455,455 | 6/1984 | Little ........................................ 379/203 |
| 4,464,543 | 8/1984 | Kline et al. .............................. 379/224 |
| 4,512,011 | 4/1985 | Turner ........................................ 370/60 |
| 4,612,623 | 9/1986 | Bazarnik .................................. 364/569 |
| 4,625,081 | 11/1986 | Lotito et al. ............................... 379/88 |
| 4,952,785 | 8/1990 | Kikuda .................................... 235/432 |
| 5,003,499 | 3/1991 | Fujiwara et al. ......................... 364/523 |
| 5,214,793 | 5/1993 | Conway et al. ......................... 455/49.1 |
| 5,278,690 | 1/1994 | Vella-Coleiro .......................... 395/152 |
| 5,319,783 | 6/1994 | Zink et al. ............................... 395/700 |

OTHER PUBLICATIONS

Cronin et al. "Network Control Center", 1981, pp. G7.3.1–G7.3.6.

*Primary Examiner*—Zarni Maung
*Attorney, Agent, or Firm*—Foley & Lardner

[57] ABSTRACT

In order to extract a message block from a maintenance message applied from a telecommunications network, a plurality of message block extracting masks is prepared. Each of the masks defines at least one position of a message block to be extracted from the maintenance information. The block extracting masks are stored in a first memory. The maintenance message is received and then stored in a second memory. Following this, the maintenance message received is identified. A mask which corresponds to the maintenance message received, is retrieved from the first memory. A message block is extracted using the mask stored in the second memory.

9 Claims, 5 Drawing Sheets

FIG. 2(A)

|   | 1 | 2 | 3 | 4 | 5 | 6 | 7 | 8 | 9 | 10 |
|---|---|---|---|---|---|---|---|---|---|----|
| 0 | T | R | A | F | F | I | C | - | A | A |
| 1 | 1 | 2 | 3 | 1 | 1 | 1 | 2 | 2 | 2 | 2 |
| 2 | 0 | 0 | 0 | 4 | 5 | 6 | X | X | X | 9 |
| ⋮ | | | | | ⋮ | | | | | |
| n | 7 | 8 | 9 | 5 | 5 | 6 | 6 | 7 | 7 | 0 |

FIG. 2(B)

|   | 1 | 2 | 3 | 4 | 5 | 6 | 7 | 8 | 9 | 10 |
|---|---|---|---|---|---|---|---|---|---|----|
| 0 | T | R | A | F | F | I | C | - | A | A |
| 1 | 1 | 2 | 3 | | | | | | | |
| 2 | | | | 4 | 5 | 6 | | | | |
| ⋮ | | BLOCK A | | | | BLOCK B | | | | |
| n | 7 | 8 | 9 | | | | | | | 0 |

BLOCK C  BLOCK D

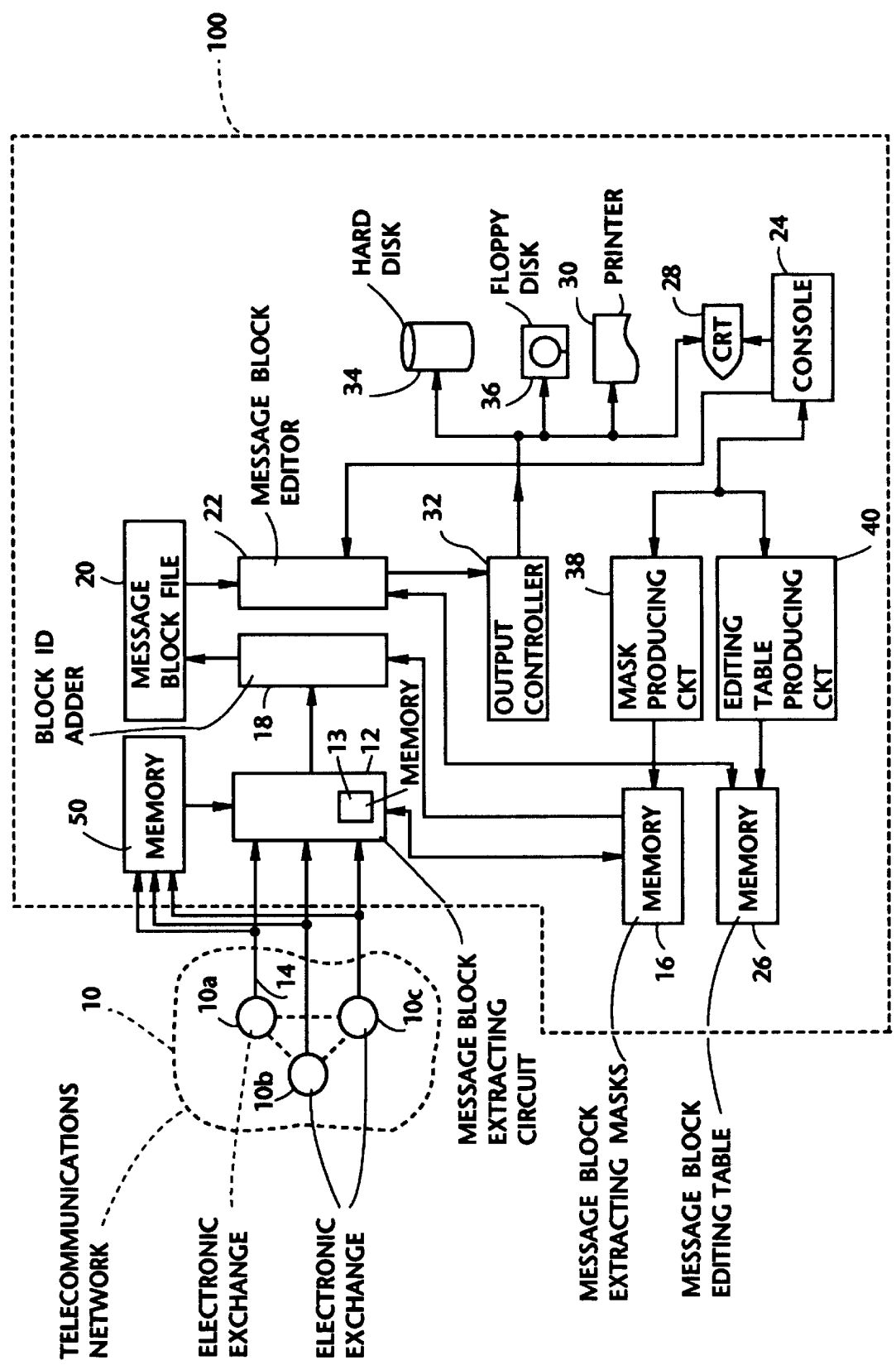

METHOD OF EXTRACTING AND EDITING MESSAGE BLOCKS IN TELECOMMUNICATIONS MANAGEMENT NETWORK AND ARRANGEMENT THEREOF

This application is a continuation of application Ser. No. 07/774,972, filed Oct. 15, 1991.

BACKGROUND OF THE INVENTION

1. Field of the Invention

The present invention relates generally to a method and arrangement of extracting and editing message blocks in a telecommunications management network, and more specifically to such a method and arrangement which is well suited for integrated network management wherein messages with different formats are received.

2. Description of the Prior Art

In order to effectively monitor, manage or maintain a telecommunications network, it is vital to acquire various kinds of managing information or messages issued from the network at a message editing and processing apparatus in an integrated network management system.

Various kinds of message which are received at such a data editing and processing apparatus, are outputted to peripheral devices such as a printer, hard disc or the like, without undergoing any processing/re-arrangement.

It in usual, except for an emergency case, that the messages reaching the data and processing apparatus are stored in a suitable memory. The received messages thus stored in the memory, undergo data processing after a suitable time interval by another system using a predetermined protocol. This technique renders it possible to selectively obtain the required message blocks from the messages received at the data editing and processing apparatus.

In other words, according to the conventional data editing and processing apparatus, all of the messages applied to the maintenance (or monitor) system are initially stored in a memory irrespective of whether or not unnecessary message blocks are included therein. Subsequently, another data processing system selects required message blocks from the message stored in a memory and handles the same in a manner which enables the requisite information to be extracted therefrom.

It is a current trend that a telecommunications network includes different types of exchanges which issue maintenance messages with different formats. Merely for the convenience of description, assume that a first exchange issues a message which includes data of a completion rate (viz., a rate of completed calls to the total number of originating subscriber calls), while a second exchange issues a message which includes, instead of a completion rate, the number of originating subscriber calls and the number of completed calls. In such a situation, if a maintenance system operator wishes to obtain a completion rate for both types of exchanges, the operator has to obtain the completion rate by dividing the number of completed calls by the number of originating subscriber calls in the case of the above-mentioned second exchange. Accordingly, the operator is required to perform extremely cumbersome operations in order to acquire the required information and arrange it in the sane single format. This problem is accentuated by the fact that message blocks indicating the same information are located at different positions with different types of exchanges.

Further, the conventional data editing and processing apparatus, outputs data according to a predetermined format. Accordingly, a system operator is unable to specify the data which is deemed important and the output from the system includes both urgent and insignificant data.

The telecommunications system includes various resources such as transmission apparatus, transmission lines, etc. which apply data in different formats to the integrated maintenance system via corresponding exchanges. It is practically impossible, in an urgent case, to extract the required information, rearrange the various inputted formats, and output data in the same single format. Thus, the prior art has encountered the problem that highly dependable maintenance operation is very difficult to achieve.

Still further, in the event that the format of the messages issued from the system operator is changed, the various resources of the telecommunications network should change the format of maintenance messages outputted therefrom, accordingly. Thus, the prior art brings about the situation wherein the telecommunications network tends to exhibit poor versatility.

SUMMARY OF THE INVENTION

It is an object of the present invention to provide a method by which desired message blocks can be extracted prior to editing in a data editing and processing apparatus.

Another object of the present invention is to provide an apparatus for effectively extracting desired message blocks in a data editing and processing apparatus.

In brief, the above objects are achieved by a method and apparatus wherein, in order to extract a message block from a maintenance message applied from a telecommunications network, a plurality of message block extracting masks is prepared. Each of the masks defines at least one position of a message block to be extracted from the maintenance information. The block extracting masks are stored in a first memory. The maintenance message is received and then stored in a second memory. Following this, the maintenance message received is identified. A mask which corresponds to the maintenance message received, is retrieved from the first memory. A message block is extracted using the mask stored in the second memory.

More specifically a first aspect of the present invention is deemed to come in a method of processing a maintenance message applied from a telecommunications network to an integrated network maintenance system, the maintenance message including an identification code and a plurality of message blocks, the method comprising the steps of: (a) preparing a plurality of message block extracting masks, each of which defines at least one position of a message block to be extracted from the maintenance message; (b) storing the plurality of message block extracting masks in a first memory; (c) receiving the maintenance message, storing same in a second memory and identifying the maintenance message; (d) retrieving a mask from the first memory, the mask corresponding to the maintenance message which is specified at step (c) by an identification attached thereto, and storing the retrieved mask in the second memory; and (e) extracting a message block using the mask which is stored in the second memory.

A second aspect of the present invention is deemed to come in a method of processing a maintenance message applied from a telecommunications network to an integrated network maintenance system, the maintenance message including an identification code and a plurality of message blocks, the method comprising the steps of: (a) preparing a plurality of message block extracting masks, each of which defines at least one position of a message block to be extracted from the maintenance message; (b) storing the plurality of message block extracting masks in a first memory; (c) preparing a message block editing table which includes a plurality of editing instructions for editing message blocks extracted; (d) storing the plurality of editing instructions in a second memory; (e) receiving the maintenance message, storing same in a third memory and identifying the maintenance message; (f) retrieving a mask from the first memory, the mask corresponding to the maintenance message which is specified at step (e) using an identification attached thereto, and storing the retrieved mask in the third memory; (g) extracting a message block using the mask which is stored in the third memory; (h) affixing the block identification to the message block extracted in step (g); (i) storing the message block bearing a block identification in a fourth memory; and (j) reading out the message blocks stored in the fourth memory, and editing the message blocks read out using one of the editing instructions stored in the second memory.

A third aspect of the present invention is deemed to come in an apparatus for processing a maintenance message applied from a telecommunications network to an integrated network maintenance system, the maintenance message including an identification code and a plurality of message blocks, the arrangement comprising: first means for preparing a plurality of message block extracting masks, each of the masks defining at least one position of a message block to be extracted from the maintenance message; a first memory for storing the plurality of message block extracting masks; a second memory; and second means for receiving the maintenance message and storing same in the second memory, the second means identifying the maintenance message and retrieving a mask from the first memory, the mask retrieved corresponding to the received maintenance message which is specified by an identification attached thereto, the second means storing the retrieved mask in the second memory and extracting a message block using the mask stored in the second memory.

BRIEF DESCRIPTION OF THE DRAWINGS

The features and advantages of the present invention will become more clearly appreciated from the following description taken in conjunction with the accompanying drawings in which:

FIGS 2(A)–2(D) are diagrams which illustrate important features of the operation of the FIG. 1 embodiment;

FIG. 6 is a block diagram showing a second embodiment of the present invention together with a telecommunications network connected thereto.

DETAILED DESCRIPTION OF THE PREFERRED EMBODIMENTS

A first embodiment of the present invention will be discussed in detail with reference to FIGS. 1 to 5.

Figure 1:
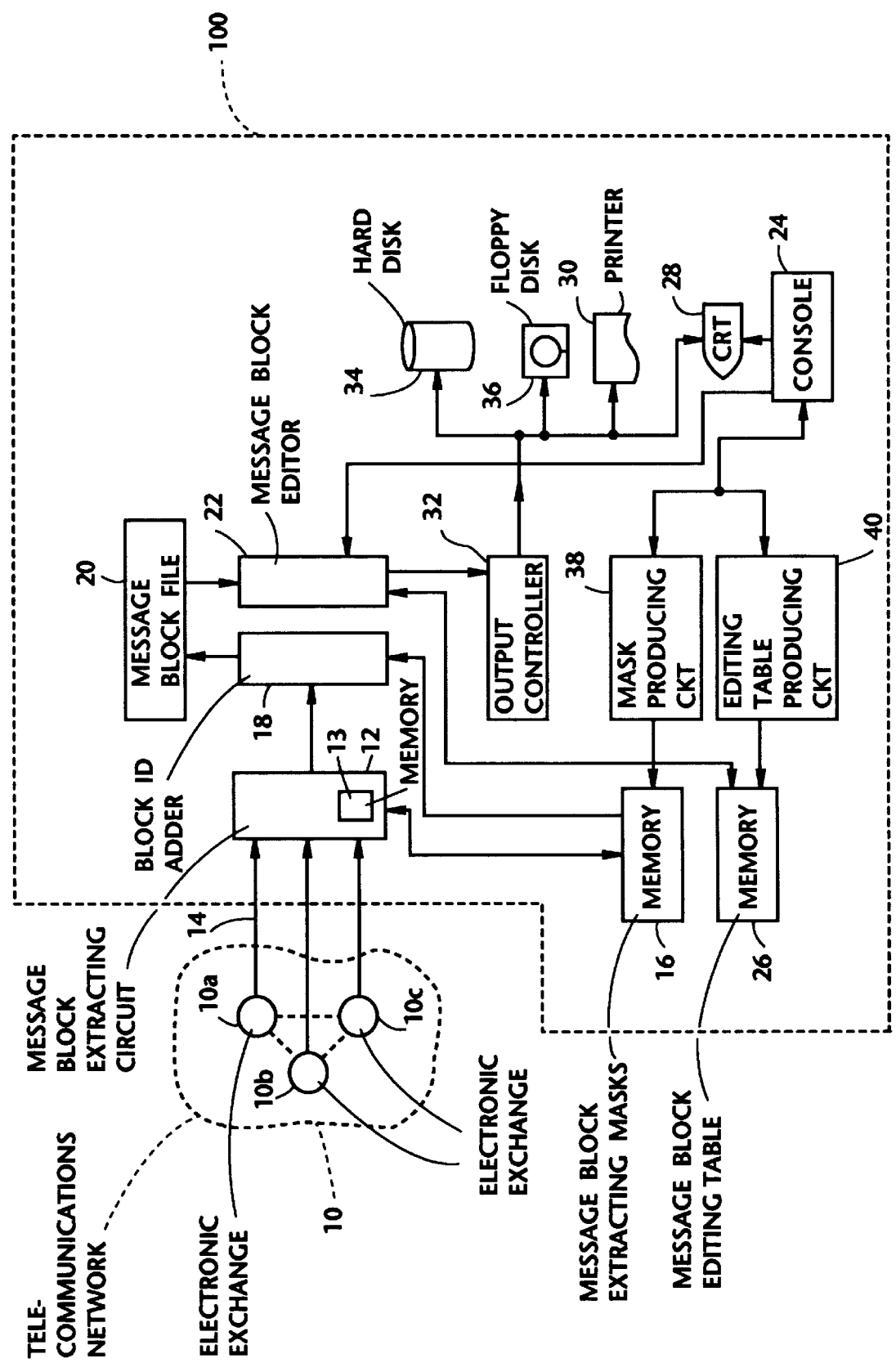
FIG. 1 is a block diagram showing an embodiment of the present invention together with a telecommunications network connected thereto.

FIG. 1 illustrates a data extracting and editing apparatus 100 in block diagram form, together with a telecommunications network 10 interconnected thereto. The apparatus 100 is directly concerned with the present invention and is provided for collecting messages issued from electronic exchanges in the telecommunications network 10. Each of the messages includes a message ID (identification) followed by a series of message blocks.

A message block extracting circuit 12 is adapted to receive a plurality of messages from electronic exchanges 10a, 10b and 10c of the telecommunications network 10. In FIG. 1, while only three exchange 10a–10c are shown, it will be fully appreciated that a vast number of exchanges are provided in an actual telecommunications network. The messages are irregularly (randomly) applied to the circuit 12.

It is assumed that the exchange 10a issues a message 14 at a given time. The message 14 is received by the message block extracting circuit 12 and stored in a memory 13 which is provided in the circuit 12 in this particular embodiment. The message 14, which is schematically shown in FIG. 2(A), includes a message ID of "TRAFFIC-AA" (by way of example) which precedes a series of characters (viz., 1, 2, 3, 1, . . . , 6, 7, 7 and 0) the number of which equals the product of (10×n). That is, as shown in FIG. 2(A), each of the rows includes ten characters and the number of rows is "n".

It is further assumed that each of the messages applied from the telecommunications network 10 includes a carriage return code (not shown in FIG. 2(A)) after every ten (10) characters. Thus, the message 14 applied to the circuit 12 may be displayed in the manner shown in FIG. 2(A). The message 14 is comprised of a plurality of message blocks whose positions are previously determined for enabling an operator to extract a necessary message block(s).

Merely for the convenience of description, it is assumed that message blocks A, B, C and D included in the message 14 are to be extracted as shown in FIG. 2(B).

Figure 2C:
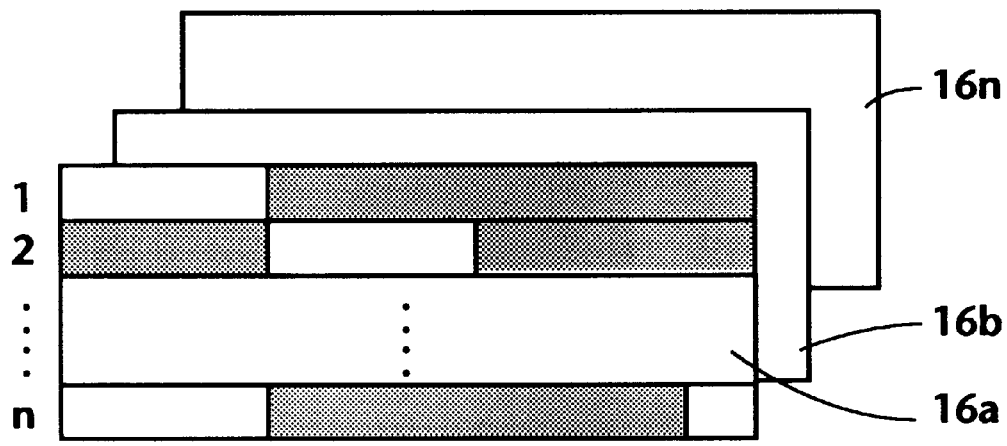
Figure 2D:
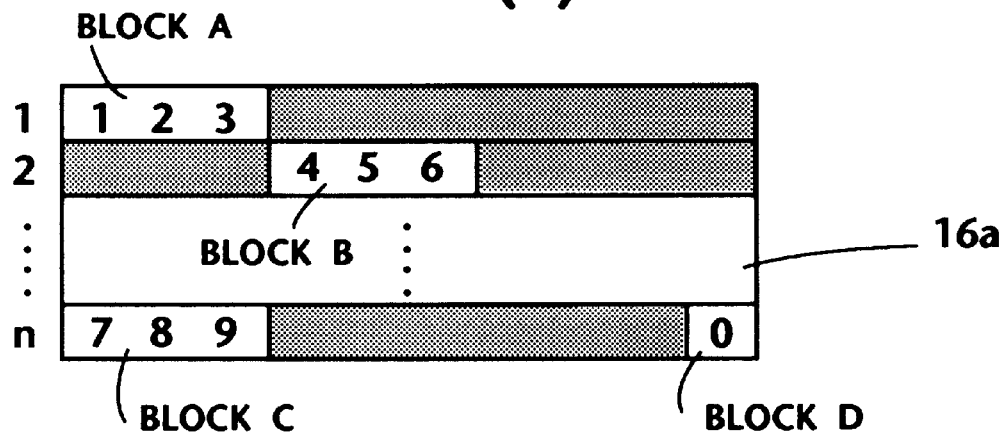

When the message block extracting circuit 12 detects the message ID (viz., "TRAFFIC-AA"), it applies a mask retrieving signal to a memory 16 which previously stores a plurality of message block extracting masks or templates 16a, 16b, . . . , 16n as shown in FIG. 2(c). It is assumed that the mask 16a is selected by the above-mentioned mask retrieving signal. Thus, the mask 16a is stored in the memory 13 in the message block extracting circuit 12. Following this, the circuit 12 extracts the message blocks A, B, C and D from the message 14 using the mask 16a, the manner of which is schematically illustrated in FIG. 2(D).

Figure 3:
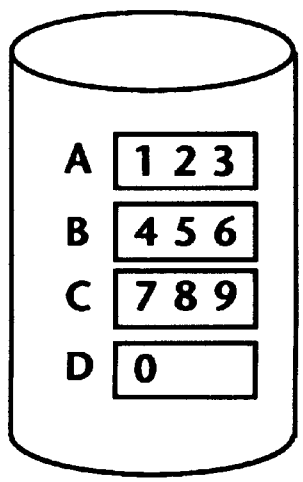
FIG. 3 shows a plurality of message blocks stored in a file which forms part of the FIG. 1 arrangement.

The message blocks A–D thus extracted are applied to a block ID adder 18 wherein block IDs A, B, C and D (for example) are respectively affixed to the message blocks A, B, C and D. Subsequently, the message blocks A–D bearing the above-mentioned IDs are memorized in a message blook file 20 as schematically illustrated in FIG. 3.

In the above described first embodiment, the contents of the blocks A, B, C and D may, merely by way of example, be as follows:

A: the number of calls completed between subscribers allotted to the exchange 10a;

B: the number of calls completed wherein the calling party is allotted to the exchange 10a, the called party is allotted to a different exchange (e.g. 10b) and the call is directly routed from the exchange 10a to the exchange 10b;

C: the number of calls completed wherein the calling party is allotted to the exchange 10b and the called party is allotted to the exchange 10a and the call is directly routed from exchange 10b to exchange 10a;

D: the number of calls completed between exchanges 10a and 10b and wherein the call is routed via exchange 10c.

The message blocks A–D stored in the file 20 are retrieved, at a later time, by a message block editor 22 in response to an instruction applied from a console 24. The message block editor 22 is operatively coupled to a memory 26 which previously stores a message block editing table of the nature shown in FIG. 4. In the event that an operator wishes to arrange the message blocks A–D stored in the file 20 in this order, the operator selects the edit instruction No. 1 by way of the console 24. Thus, the message blocks A–D are arranged by the editor 22 as shown in FIG. 5. Following this, the message blocks A–D are displayed on a cathode ray tube (CRT) 28 or the like type of display and printed out at a printer 30 under control of an output controller 32. On the other hand, the message blocks A–D may be stored in a hard disk 34 and/or a floppy disk 36 in response to an operator's instruction.

The message block extracting masks 16a–16n are prepared using the console 24, the CRT 28, and a mask producing circuit 38 by an operator. By way of example, a system operator fills in the character positions with logic 1's, which positions correspond to the position of the message block to be extracted. On the other hand, the character positions which correspond to an unnecessary message block, are filled in with logic 0's. The positions of the message blocks of a given message applied from the network 10, are previously determined and, accordingly, the extracting circuit 12 is able to pick up the desired message blocks using the corresponding mask.

Figure 4:
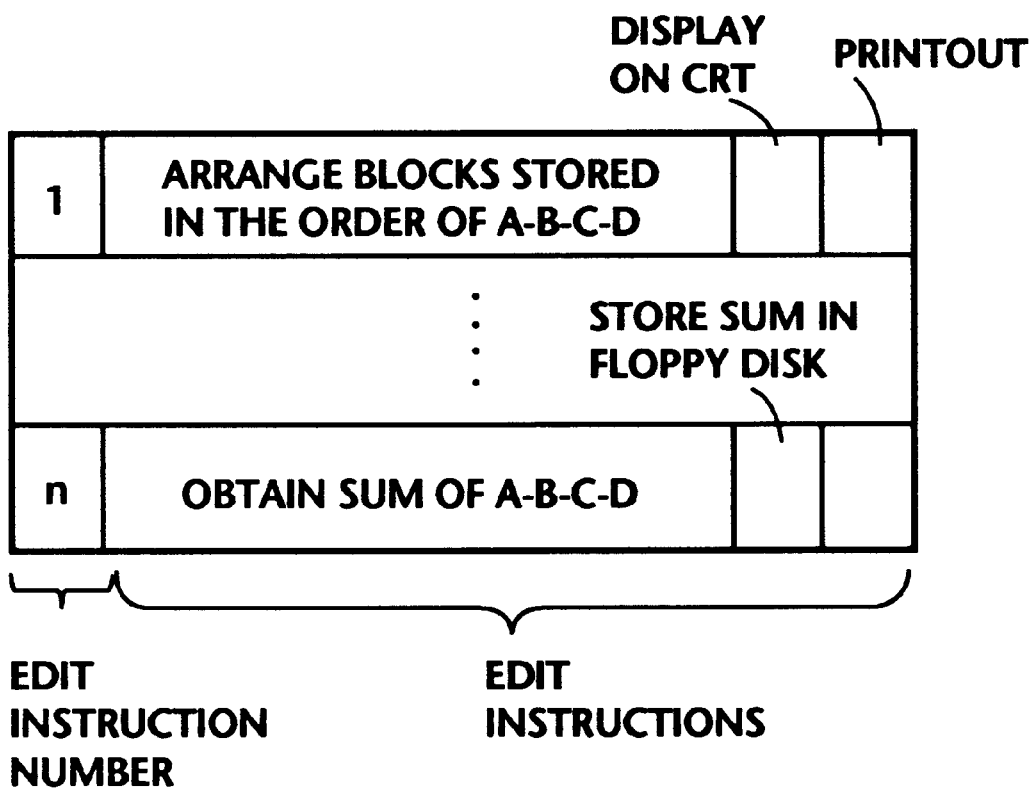
FIG. 4 is a message block editing table stored in a memory which forms part of the FIG. 1 arrangement.
Figure 5:
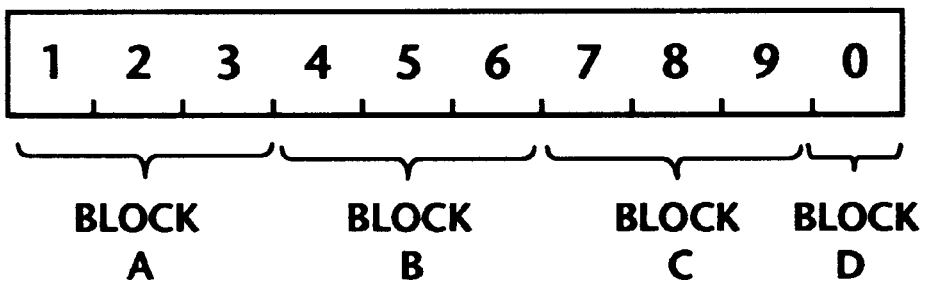
FIG. 5 is a diagram showing the result of block edit implemented by the FIG. 1 arrangement.

On the other hand, the message block editing table shown in FIG. 4 is prepared using the console 24, the CRT 28, and an editing table producing circuit 40. Preparation of such a table is well known to those skilled in the art and hence further redundant descriptions are deemed unnecessary for the sake of brevity.

Thus, in the event that various masks are prepared in a manner to meet different information formats along which the messages are forwarded to the message block extracting circuit 12, only requisite message blocks can be extracted and then edited into an output format desired by a maintenance or monitor operator.

Reference is now made to FIG. 6, wherein a second embodiment of the present invention is shown in block diagram form.

The arrangement of FIG. 6 differs from that of FIG. 1 in that the former arrangement further includes a memory 50 with a large storage capacity. The memory 50 is arranged to store all of the messages issued from the exchanges 10a–10b. The operations or the FIG. 6 arrangement are identical with those of the FIG. 1 arrangement except that the message blocks not extracted by the circuit 12 on a real time basis may be picked up by the circuit 12 at a later time using a different block extracting mask stored in the memory 16. The second embodiment in found advantageous in the case where a certain message block(s) becomes significant at a later time.

While the foregoing description describes two embodiments according to the present invention, the various alternatives and modifications possible without departing from the scope of the present invention, which is limited only by the appended claims, will be apparent to those skilled in the art.

What is claimed is:

1. A method of processing a maintenance message applied from a telecommunications network to an integrated network maintenance system, the maintenance message including an identification code and a plurality of message blocks, the maintenance message indicating status information of the telecommunications network, the method comprising the steps of:

(a) preparing a plurality of message block extracting masks by an operator input through a console, wherein each of the message block extracting masks defines at least one position of a message block to be extracted from the maintenance message;

(b) storing the plurality of message block extracting masks in a first memory;

(c) receiving the maintenance message, storing the maintenance message in a second memory and identifying the maintenance message based on the identification code of the received maintenance message;

(d) retrieving one of the message block extracting masks from the first memory based on the identification code of the received maintenance message, and storing the retrieved mask in the second memory;

(e) extracting one of the message blocks from the received maintenance message using the retrieved mask stored in the second memory;

(f) affixing a block identification to the message block extracted in step (e); and (g) storing the message block with the block identification in a third memory.

2. A method of processing a maintenance message applied from a telecommunications network to an integrated network maintenance system, the maintenance message including an identification code and a plurality of message blocks, the maintenance message indicating status information of the telecommunications network, the method comprising the steps of:

(a) preparing a plurality of message block extracting masks by an operator input through a console, wherein each of the message block extracting masks defines at least one position of a message block to be extracted from the maintenance message;

(b) storing the plurality of message block extracting masks in a first memory;

(c) receiving the maintenance message, storing the maintenance message in a second memory and identifying the maintenance message based on the identification code of the received maintenance message;

(d) retrieving one of the message block extracting masks from the first memory based on the identification code of the received maintenance message, and storing the retrieved mask in the second memory;

(e) extracting one of the message blocks from the received maintenance message using the retrieved mask stored in the second memory;

(f) affixing a block identification to the message block extracted in step (e);

(g) storing the message block with the block identification in a third memory;

(h) preparing a message block editing table which includes a plurality of editing instructions for positioning the message block stored in the third memory;

(i) storing the message block editing table which includes the plurality of editing instructions in a fourth memory; and (j) reading out the message block stored in the third memory according to an instruction from the console, and editing the message block read out using one of the editing instructions stored in the fourth memory into an output format desired by an operator.

3. A method of processing a maintenance message applied from a telecommunications network to an integrated network maintenance system, the maintenance message including an identification code and a plurality of message blocks, the method comprising the steps of:

(a) preparing a plurality of message block extracting masks, each of which defines at least one position of a message block to be extracted from the maintenance message;

(b) storing the plurality of message block extracting masks in a first memory;

(c) preparing a message block editing table which includes a plurality of editing instructions for editing message blocks extracted;

(d) storing the plurality of editing instructions in a second memory;

(e) receiving the maintenance message, storing same in a third memory different from said second memory and identifying the maintenance massage;

(f) retrieving a mask from the first memory, the mask corresponding to the maintenance message which is specified at step (e) using an identification attached thereto, and storing the retrieved mask in the third memory;

(g) extracting a message block using the mask which is stored in the third memory;

(h) affixing the block identification to the message block extracted in step (g);

(i) storing the message block bearing a block identification in a fourth memory; and (j) reading out the message blocks stored in the fourth memory, and editing the message blocks read out using one of the editing instructions stored in the second memory.

4. An apparatus for processing a maintenance message applied from a telecommunications network to an integrated network maintenance system, the maintenance message including an identification code and a plurality of message blocks, the maintenance message indicating status information of the telecommunications network the apparatus comprising:

first means for preparing a plurality of message block extracting masks by an operator input through a console, each of the message block extracting masks defining at least one position of a message block to be extracted from the maintenance message;

a first memory for storing the plurality of message block extracting masks;

a second memory;

second means for receiving the maintenance message and storing the maintenance message in the second memory, the second means identifying the maintenance message based on the identification code and retrieving one of the message block extracting masks from the first memory, the mask retrieved based on the identification code of the received maintenance message, the second means storing the retrieved mask in the second memory and extracting one of the message blocks from the received maintenance message using the retrieved mask stored in the second memory;

block ID adding means for affixing a respective block identification to the extracted message block from said second means; and a third memory connected to said block ID adding means, the third memory storing the extracted message block with the affixed block identification.

5. An apparatus as claimed in claim 4, wherein a plurality of message blocks are extracted from the received maintenance message by the second means, wherein the block ID adding means affixes a unique block identification to each of the extracted message blocks received from the second means, and wherein the third memory stores each of the extracted message blocks along with their corresponding unique block identifications, the apparatus further comprising:

a message block editing table which includes a plurality of editing instructions for positioning the extracted message blocks into a particular sequential order; and a fourth memory for storing the extracted memory blocks in the particular sequential order.

6. An apparatus as claimed in claim 5, further comprising a display configured to display the extracted message blocks in the particular sequential order to an operator.

7. An apparatus as claimed in claim 5, further comprising a plurality of displays each configured to display the extracted message blocks in the particular sequential order to an operator, wherein the message block editing table further includes a field indicating which one of the plurality of displays that the extracted message blocks in the particular sequential order is to be displayed on.

8. An apparatus as claimed in claim 7, wherein the plurality of displays include a printer and a cathode ray tube.

9. An apparatus as claimed in claim 5, wherein the plurality of editing instructions include:

a first subset of instructions for performing arithmetic operations on the extracted message blocks; and a second subset of instructions for performing positioning of the extracted message blocks into one of a plurality of sequential orders.

* * * * *